United States Patent Office 3,709,792
Patented Jan. 9, 1973

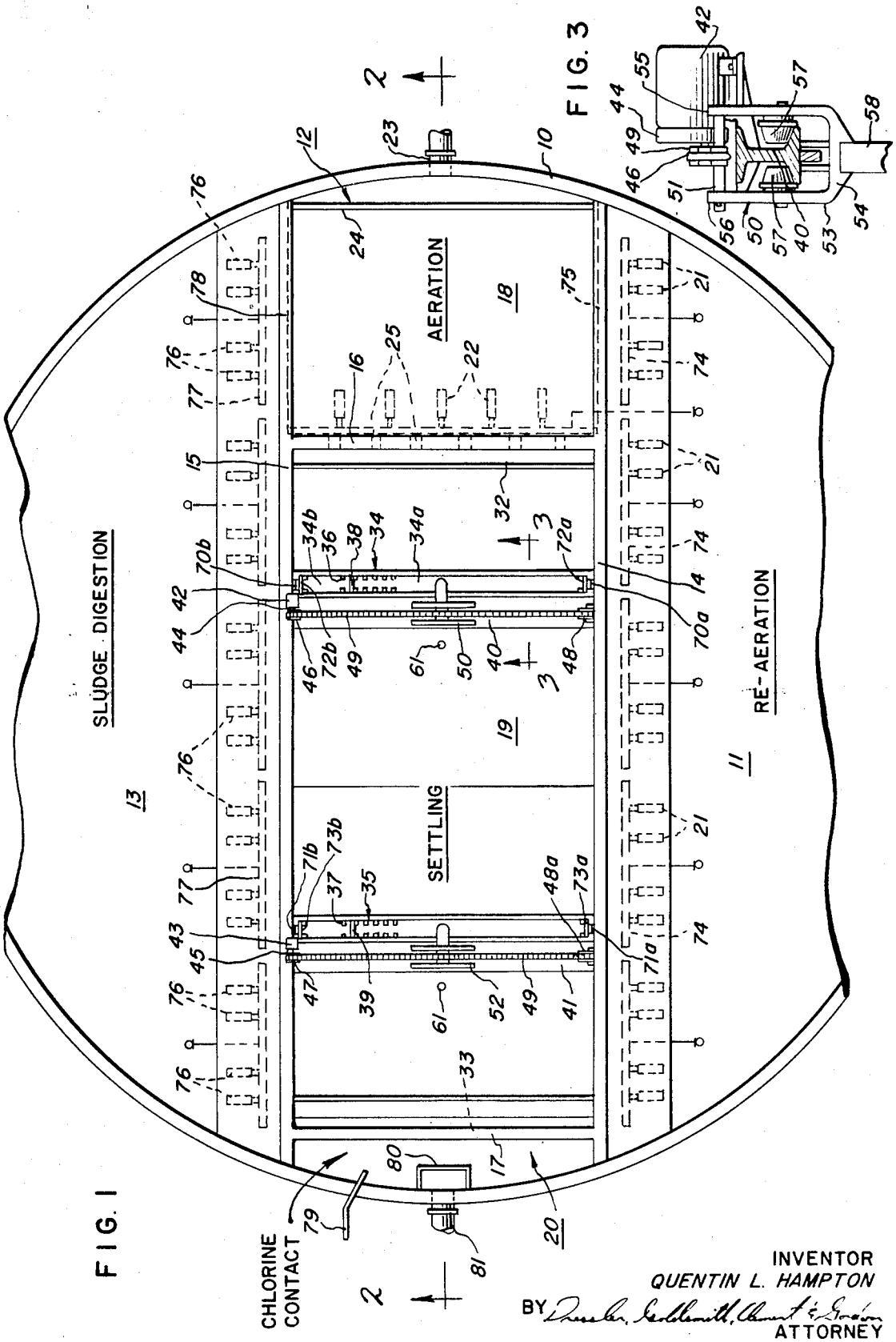

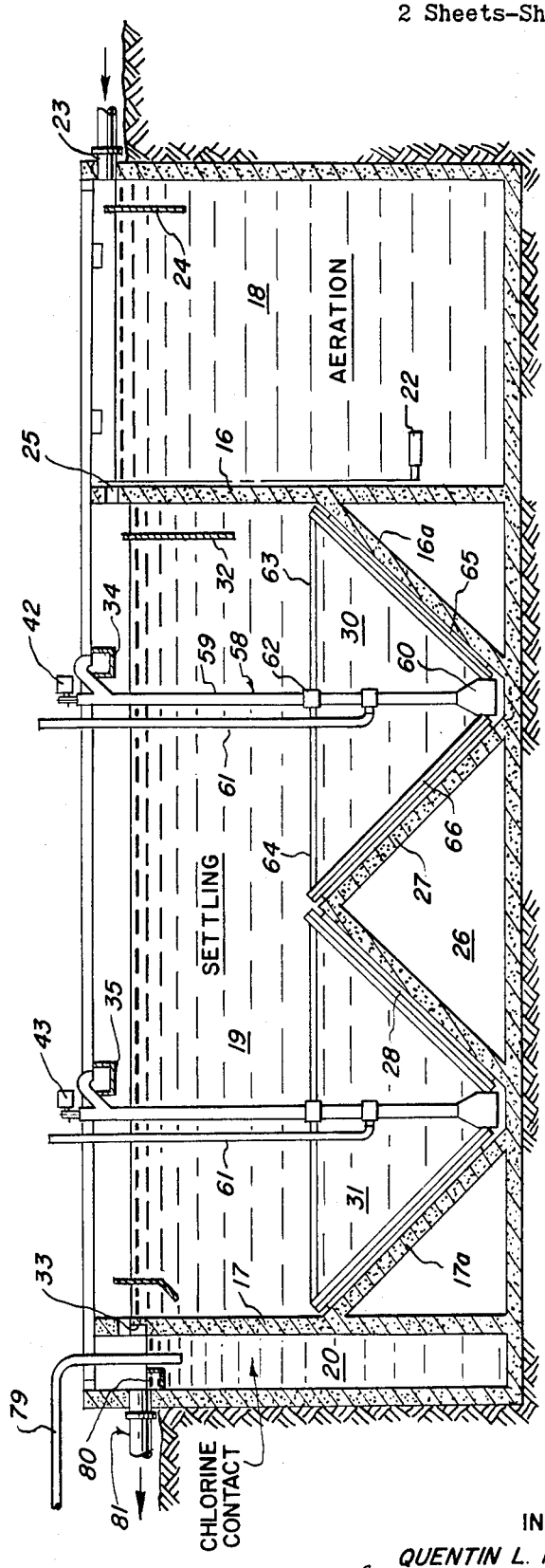

3,709,792
METHOD AND APPARATUS FOR TREATING SEWAGE
Quentin L. Hampton, Ormand Beach, Fla., assignor to FMC Corporation, San Jose, Calif.
Continuation-in-part of abandoned application Ser. No. 843,071, July 18, 1969. This application Feb. 16, 1971, Ser. No. 115,505
Int. Cl. C02c 1/06
U.S. Cl. 210—7                              8 Claims

ABSTRACT OF THE DISCLOSURE

An apparatus for treating sewage having a central zone compartmentalized to provide in line aeration, settling and disinfecting compartments with a common longitudinal axis for liquid flow therethrough and having a sludge digestion compartment along one lateral side of said central zone and a sludge re-aeration compartment along the other lateral side of said central zone. Means are provided along the lateral side of the aeration compartment running parallel to the longitudinal flow axis, designed to deliver supernatant liquor with uniform distribution along the full length of the wall common to the digestion compartment and said aeration compartment and a re-aerated recycle sludge medium with uniform distribution along the full length of the wall common to said re-aeration compartment and said aeration compartment. Liquid flow conducting means are positioned transverse to the longitudinal flow axis of the settling compartment and above the normal liquid level therin and control means are provided to direct part of the sludge to the re-aeration compartment and the balance of the sludge to the digestion compartment. Conduit means movable in said settling compartment transverse to the longitudinal flow axis is associated with said flow conducting means for delivery of sludge from the settling compartment and airlift means induces movement of settled sludge through said conduit means.

This application is a continuation-in-part of application Ser. No. 843,071, filed July 18, 1969, entitled Method and Apparatus for Treating Sewage, now abandoned.

This invention relates to an activated sludge type process for the treamtent of sewage. More particularly, it relates to novel apparatus for removal of Biochemical Oxygen Demand from sewage. Still more particularly, it relates to a compact system for aerobic treatment of sewage and to apparatus for carrying out the process wherein control is provided over the type of sludge which is recycled.

Briefly, the method of treating sewage of this invention to effect a high degree of Biochemical Oxygen Demand (B.O.D.) removal involves steps wherein aqueous waste is mixed with aerated, concentrated sludge from a re-aeration zone and a supernatant liquod from an aerobic sludge digestion zone to form a mixed liquor. Air is introduced into both the aeration zone for mixed liquor, the aerobic digestion zone and the reaeration zone for sludge concentrate. Sludge is settled from the mixed liquor transferred from the aeration zone to a settling zone which is in longitudinal flow axial alignment therewith, in a plurality of sludge accumulation areas positioned transverse to the longitudinal axis of the zone. A concentrate of sludge is removed from the bottom of said accumulation areas progressively and sequentially and sludge from one of said areas is discharged into a flow course which delivers predetermined quantities of the sludge concentrate to the re-aeration zone. Aerated sludge, formed in a re-aeration zone and supernatant liquor formed in said digestion zone, are discharged into the aeration zone from the respective zones with uniform distribution with regard to the longitudinal flow axis thereof. Operation in the described manner produces a clarified effluent and a digested solids residue.

In conventional activated sludge sewage treatment systems, mixed liquor after aeration is transferred to a settling tank where the sludge is concentrated. Generally, sludge is removed from the settling tank and a piping and pump system returns a portion of the concentrate of sludge to the aeration tank to act as seed material in furthering the aerobic treatment and the balance of the sludge is discharged to waste.

The effectiveness of recycle sludge in furthering the aerobic treatment is markedly altered by the length of time the microorganisms agglomerated into flocs are starved from oxygen in accomplishing the concentration by gravity. In a gravity separation, the concentrate of settling flocs, usually referred to as a sludge blanket, is lightly compacted and relatively slow to thicken and acts as an easily disrupted filter for the flocs present in suspension, the liquid portion of which is being displaced upwardly through the sludge blanket. This sludge blanket contains heavy and light varieties of flocs of somewhat different stabilities and such differences in stability can lead to stratification and a hang-up in settling which can require holding sludge for extensive periods under anaerobic conditions, a condition that gives rise to mixtures of sludge of drastically different biological activity and results in reduced biological activity of the sludge to be recycled and markedly effects the efficiency of any activated sludge type of process and also the size of the settling tank required to provide sufficient holding time to permit settling of sludges of high volume index. A typical process which creates such sludge mixtures is shown in Jones, French Pat. No. 493,985. The process disclosed accumulates sludge in three settling tanks arranged for liquid flow therethrough in sequence. Sludge from individual tanks which have different periods of holding sludge under anaerobic conditions are delivered to sludge wells which feed sludge to a re-aeration tank creating a mixture of sludge, components of which have drastically different biological activities.

Inasmuch as the efficiency of the activated sludge process is in part dependent upon the settling tank operation and the character of the sludge collected in the settling tank and recycled to the aeration tank, control of the character of the sludge being recycled is an important factor in determining the overall efficiency of treatment of sewage as measured by removal of B.O.D.

Now it has been discovered that improved operating efficiencies and B.O.D. removal may be obtained through reducing the time sludge is held in a gravity settling tank and starved for oxygen by having a multiplicity of means for progressively and sequentially removing individual sludge fractions from parallel accumulation areas of short length positioned transverse to the direction of liquid flow through the settling tank and then continuously transferring at least a predetermined portion of the sludge removed from at least one of said accumulation areas to a re-aeration zone for biologically activating the sludge and the re-aerated sludge concentrate is returned to the aeration zone with uniform distribution with regard to the longitudinal direction of liquid flow so as to eliminate areas of concentrated oxygen demand and insure continuity of biological activity throughout the aeration zone.

In accordance with one embodiment of this invention, a method of treating sewage is provided with comprises establishing contiguous aeration and settling zones extending end to end with a common longitudinal axis and a re-aeration zone and a sludge digestion zone along the opposite longitudinal sides of said contiguous zones, forming a mixed liquor in said aeration zone consisting of raw sewage, supernatant liquor delivered with uniform distribution along the wall common to said digestion zone and said aeration zone and a re-aerated sludge delivered with uniform distribution along the wall common to said re-aeration zone and said aeration zone, introducing gas-containing oxygen into said mixed liquor in said aeration zone, discharging aerated mixed liquor from said aeration zone to a unitary settling zone where the sludge settles by gravity and concentrates in a plurality of parallel areas of limited width positioned transverse to said longitudinal flow axis whereby the accumulated concentrates in each area are made up of particles of relatively uniform settling rates, removing a sludge concentrate fraction from the bottom of each of said areas of limited width progressively and sequentially, discharging each sludge fraction removed from said settling zone to a flow course positioned above said settling zone and extending transverse to said longitudinal axis, said flow courses each being arranged to discharge sludge to an aerobic digestion zone an done of said flow courses being arranged to deliver at least a major portion of a single sludge fraction to the re-aeration zone, introducing gas-containing oxygen into said re-aeration zone and into said digestion zone, directly discharging re-aerated sludge to said aeration zone for forming said mixed liquor and discharging clarified effluent from said settling zone.

In a preferred embodiment of the process which is carried out in a circular tank with contiguous aeration, settling and disinfecting zones extending end to end with a common longitudinal axis and a sludge re-aeration and a sludge digestion zone on opposite sides of said longitudinally extending contiguous zones, the steps comprise forming a mixed liquid in said aeration zone consisting of raw sewage, supernatant from said digestion zone and sludge from said re-aeration zone, introducing gas-containing oxygen into said mixed liquor in said aeration zone, discharging mixed liquor from said aeration zone to said settling zone where the sludge settles by gravity and accumulates in a plurality of accumulation areas of limited width positioned transverse to said longitudinal axis, removing a concentrate of sludge solids from the bottom of each of said areas of limited width progressively and sequentially, discharging said sludge removed from each of said settling tank areas to independent flow courses, one of which delivers a predetermined portion of the sludge to the re-aeration zone and any balance of the sludge to said digestion zone, introducing gas-containing oxygen into said re-aeration zone, discharging re-aerated sludge from said re-aeration zone, introducing said discharged re-aerated sludge into said aeration zone and distributing it in a substantially uniform pattern with regard to said longitudinal axis, accumulating in said digestion zone a digestion sludge residue and a clarified supernatant liquor, introducing said supernatant liquor into said aeration zone and distributing it in a substantially uniform pattern with regard to said longitudinal axis, discharging clarified effluent from said settling zone to said disinfecting zone, mixing said clarified effluent with disinfecting medium, and discharging the disinfected clarified effluent to a receiving body of water.

The method involves a combination of operations in aeration and settling zones performed under very specific interrelated conditions. Maintenance of good operating conditions requires ability to vary the quantities of the various sludge fractions which are discharged to the aerobic digestion zone for elimination of biological activity and the quantities which are recycled to maintain a proper biologically active solids content in the aeration zone. The apparatus, hereinafter described, permits control of the direction of discharge of sludge, i.e., to the aeration or digestion zones from the channels associated with each exhaust unit operating in the settling zone, as well as the proportion of each sludge fraction sent in each direction so that, when necessary, all of the sludge moving in one or more of the channels can be directed to the re-aeration zone or any desired portion of sludge can be wasted from any trough at any time.

In the aeration tank, a mixed liquor is formed consisting of raw sewage, re-aerated sludge and supernatant liquor from the sludge digestion zone, when available, the latter two aqueous medium being introduced with substantially uniform distribution with regard to the longitudinal direction of liquid flow through the aeration zone.

Mixed liquor discharged from the aeration zone is introduced into the tank for the settling operation in a manner providing for quiescent longitudinal flow. Solids settle in a zone having a bottom which consists of a plurality of troughs positioned widthwise of the settling tank. The most settled layer of sludge solids, i.e., sludge adjacent the floor of each trough, is removed progressively and sequentially by a moving exhaust unit which in each periodic cycle moves at a rate slow enough to avoid serious agitation of the settling sludge, to positions adjacent various portions of the trough bottom so that eventually it traverses the entire area and limits the sludge accumulated at the bottom to a maximum residence time as settled sludge, preferably of less than thirty minutes. The multiplicity of exhaust units operating in parallel may be operated at different speeds, i.e., the maximum residence time in the trough nearest the inlet to the settling tank may be varied from equal time to about one-half the settling period of the sludge in the trough furthest removed from the inlet.

Progressively and sequentially means that sludge solids accumulated in the bottom of a trough are picked up by an exhaust unit movable to position its intake over an accumulation area as the unit travels a fixed path. Upon reaching the end of the fixed path, i.e., the end of the transverse trough, the pick-up unit reverses the direction of movement to pick up solids settled to the trough bottom after passage of the pick-up unit in its previous pass along the trough.

In one embodiment of the invention, the removed solids concentrate is discharged from a movable exhaust unit into a liquid flow channel associated with each exhaust unit. The sludge fraction discharged into each liquid flow channel generally has a unidirectional flow, i.e., the flow in the channel generally carrying the concentration of heaviest solids is to the re-aeration zone and in the other channels to either the digestion zone or to the re-aeration zone. Unidirectional flow is accomplished by providing adjustable closure means at the ends of the channels so that one end of a channel may be open while the other end is closed. In order to provide flexibility with regard to amounts of sludge to be recycled through the re-aeration zone, the channel communicating with the re-aeration zone is provided with means, such as a vertical plate positionable to divide the channel into two portions. When the plate is set in position and the outlets at both ends of the channel are open, the length of each portion will determine the proportion of the sludge received in the channel which will be discharged to the re-aeration zone and to the digestion zone.

The troughs running the width of the settling zone are bound so that in the downwardly direction, each has a progressively smaller cross section terminating at a floor or horizontal boundary. The angle of the sloping walls may vary between about 70 degrees and 30 degrees from the horizontal. To assure that there is continuous settling and avoidance of solids holdup, scraper type mechanisms may be installed on the exhaust unit, which contact the walls of the trough, particularly if the sloping walls have an angle of inclination less than about 50 degrees.

The movable unit for exhausting sludge concentrate from the settling tank is preferably adapted to move in the settling zone at a rate generally of 2 to 5 feet per minute. The unit may be adapted to move back and forth over a distance of about 5 to 30 feet. Each sludge exhausting unit should have a rate of travel and be adapted to traverse a distance which will insure that each portion of the bottom of an accumulation area has the sludge removed therefrom once every 15 to 30 minutes and preferably once every 5 to 10 minutes.

Pickup or removal of sludge solids is accomplished as the footpiece of the sludge removed unit, i.e., an enlarged head generally having an inlet port on the bottom side spanning an area which is small in the direction of travel compared to the width of the floor area from which accumulated solids are to be removed, moves adjacent to and above accumulation areas of the settling zone floor.

As the footpiece moves along, it picks up sludge progressively and sequentially until the entire floor area has been traversed. The rate of travel of the footpiece is sufficiently slow as to cause a minimum of disturbance to sludge settling above the horizontal elevation of the footpiece. After the footpiece picks up the sludge in an area and moves on to the next area, the sludge settling operation goes on unabated in the area just vacated by the footpiece.

A portion of the sludge is transferred to a common receiver for disposal by suitable means. Preferably, the common receiver is an aerobic digestion zone, i.e., a zone in which the organic or volatile matter in sludge is subjected to extended aeration with the result that the matter is gasified, liquefied or converted into more stable organic matter through the activities of aerobic organisms.

Sludge which is not discharged to the common receiver, i.e., the sludge fraction to be recycled as seed material, is discharged to a re-aeration zone where the sludge is held for a short time and aerated to avoid any oxygen deficiency of the liquid and to effect intensification of its biological activity.

When proper operating conditions have been achieved, control of the type and quantity of sludge fed to the re-aeration tank makes available a continuous supply of active microorganisms, i.e., biologically active sludge for recycle to the aeration tank.

One type of apparatus for carrying out the process comprises a tank compartmentalized by parallel partitions dividing said tank into a central compartment in which liquid flow is lengthwise thereof positioned between outer compartments extending the length of said central compartment, a wall member positioned transverse to the parallel partitions dividing the central compartment into aeration and settling compartments, angularly disposed lower walls bounding said settling compartment to form sludge accumulation troughs in the bottom thereof which are positioned transverse to the longitudinal flow axis of said central compartment, inlet means at one end of said central compartment for introduction of sewage into said aeration compartment, means for introducing oxygen-bearing gaseous medium into the contents of said aeration compartment, means for discharge of clarified effluent from the settling compartment, liquid flow conducting means positioned widthwise of the settling compartment and above the normal liquid level in said settling compartments, said liquid flow conducting means communicating through outlets at the ends thereof with said outer compartments extending the length of said central compartment, control means in said liquid flow conducting means to regulate the volume of flow of sludge directed to said outer compartments, closure means for said outlets to said outer compartments, means for selectively positioning the closure means for said outlets so as to permit all of the sludge fraction moving in one of said flow conducting means or that portion thereof which is directed to the re-aeration compartment end of said flow conducting means by said control means to flow into said re-aeration compartment, conduit means movable widthwise in said settling compartment with the inlet positioned adjacent the bottom of said sludge accumulation trough in the bottom of said settling compartment and an outlet positioned to discharge sludge into said liquid flow conducting means, means for creating suction at said inlet to move sludge therethrough and cause the sludge to move through said conduit means and discharge into said liquid flow conducting means, means for introducing oxygen-bearing gaseous medium into at least one of the outer compartments extending the length of said central compartment, and means positioned along a side of said aeration compartment common to said re-aeration compartment and parallel to the direction of sewage flow therethrough adapted to deliver recycle sludge of intensified biological activity from said re-aeration compartment extending the length of said central compartment with uniform distribution to said aeration compartment.

In a preferred embodiment, the apparatus for treatment of sewage having particular advantages involving fractionating the fluocculant sludge into two or more separable fractions, comprises a tank compartmentalized by parallel partitions positioned parallel to the tank diameter, said partitions dividing said tank into a central compartment in which liquid flow is lengthwise thereof, a sludge re-aeration compartment and a digestion compartment, spaced wall members positioned transverse to the parallel partitions dividing the central compartment into an aeration compartment, a settling compartment and an effluent disinfecting compartment, inlet means at one end of said central compartment for introduction of sewage into said aeration compartment, means for introducing oxygen-bearing gaseous medium into the contents of said aeration compartment, means positioned along the side of said aeration compartment common to said re-aeration compartment and parallel to the direction of sewage flow therethrough adapted to deliver recycle sludge of intensified biological activity from said re-aeration zone to said aeration compartment with uniform distribution, overflow weir means mounted on the wall member separating said aeration and settling tank opposite to the inlet means for sewage for transfer of aerated mixed liquor to said settling compartment overflow weir means for transfer of clarified effluent from the settling compartment to the disinfecting compartment, a multiplicity of liquid flow conducting means positioned widthwide of the settling compartment and above the normal liquid level in said settling compartment to the disinfecting compartment, a multiplicity of liquid flow conducting means positioned widthwise of the settling compartment and above the normal liquid level in said settling compartment, said liquid flow conducting means communicating through outlets at their ends with said re-aeration and digestion compartments, closure means for said outlets to said re-aeration and digestion compartments, means for selectively setting said closure means in positions permitting discharge of the sludge fraction received in one of said flow conducting means to said re-aeration compartment or through the dual outlets to both said re-aeration compartment and said digestion compartment and discharge of the sludge fractions received in the other flow conducting means into said digestion compartment, control means in said flow conducting means having said dual outlets in discharge position for regulation of the volume of sludge directed to said re-aeration and said digestion compartments, a plurality of conduit means movable widthwise in said settling compartment in spaced parallel troughs with their inlets positioned adjacent the bottom of said troughs and the outlets positioned to discharge sludge into said liquid flow conducting means, means for creating suction at said inlets to move sludge therethrough and cause the sludge to move through said conduit means and discharge into separate liquid flow conduit means.

The invention will be further understood from the following description of an embodiment of the invention taken in conjunction with the accompanying drawings in which:

FIG. 1 is a top plan view of a round tank having compartments for aerating mixed liquor, separating sludge, disinfecting clarified effluent, re-aerating sludge concentrate and disgesting concentrated sludge.

FIG. 2 is a vertical sectional view along the line 2—2 of FIG. 1.

FIG. 3 is a sectional view along the line 3—3 of FIG. 1 showing the mounting for the trolley which supports the sludge transfer unit.

In the drawings, the numeral 10 indicates a tank of suitable material of construction. Tank 10 is divided into three main segments 11, 12 and 13 by walls 14 and 15. Segment 12 is divided by walls 16 and 17 into an aeration compartment 18, a settling compartment 19 and a disinfecting compartment 20.

Aeration in segment 11 designed for re-aeration of sludge and in aeration compartment 18 is effected by introduction of air through dispersers 2 and 22, respectively. Dispersers 21 and 22 are supported by the pipes communicating with headers which deliver air from a source under pressure which is not shown.

Sewage is introduced into aeration compartment 18 through conduit 23. Distribution of the sewage is effected by positioning of a baffle 24 adjacent the inlet wall which extends above the normal liquid level maintained in the tank. Mixed liquor flows from compartment 18 to settling compartment 19 through ports 25 in wall 16.

Settling compartment 19 is bounded by side walls 16 and 17 and by sloping portions 16a and 17a. When, as illustrated, two troughs are formed in the bottom of settling compartment 19, a fillet 26 is positioned in the bottom with sloping walls 27 and 28 designed to cooperate with sloping walls 16a and 17a, respectively, to produce separate troughs 30 and 31. Adjacent wall 16 and spaced therefrom a distance determinable by the average volume flow and the maximum velocity desired for mixed liquor entering the settling tank is a baffle 32.

Wall 17 is adapted with an overflow weir 33 which discharges clarified effluent to disinfecting compartment 20.

Walls 14 and 15 support sludge channels 34 and 35. Channels 34 and 35 are provided with adjustable control means dividing, for example, channel 34 into segments 34a and 34b for proportioning the quantities of sludge discharged to the re-aeration compartment 11 and digestion compartment 13 consisting of spaced slot adjustment lugs 36 and 37, respectively, adapted to hold adjustable gates 38 and 39, respectively, in vertical positions.

Walls 14 and 15 also support beam members 40 and 41. A power source such as electric motors 42 and 43 are supported by one end of the beam members. Also supported on the beams 40 and 41 is a conventional gear reduction unit 44 and 45. The drive shaft of motor 42 and 43 is connected by a suitable coupling to the input shaft of the gear reduction units 44 and 45, respectively. Both of the gear reduction units 44 and 45 have an output shaft upon which is mounted a sprocket wheel, shown at 46 and 47, respectively.

Beam members 40 and 41 at the end opposite to that supporting the gear reduction unit supports a bearing assembly in which is journaled a shaft which has splined thereto idler wheels 48 and 48a, respectively. An endless chain 49 is trained over the sprocket wheel 46 and idler wheel 48, and has the ends thereof pivotally connected to a pin 51 supported by a trolley 50. A similar endless chain is trained over the wheels 47 and 48a and has the ends thereof pivotally connected to a pin supported by a trolley 52.

Trolleys 50 and 52 and the movable exhaust units supported thereby are similar in construction and like numerals are applied in the following description to like parts.

The trolleys include a frame 53 of a U-shaped cross section having a bottom 54 disposed beneath the beam 40 and sides 55 and 56 in which are journaled axles for flanged wheels 57 which straddle the web of beam 40 and rest upon the bottom flange thereof. Thus, the trolley 50 is supported for free travel back and forth above the open top of tank compartment 19. Sides 55 and 56 extend above the top of the beam and support the pin 51 to which the ends of chain 49 are secured.

A pump 58 of a conventional airlift type is supported by the bottom 54 of the trolley in a position suspended below the beam 40. The pump 58 includes an elongated conduit 59. The elongated conduit has a footpiece 60 at the lower end thereof positioned adjacent the bottom of the trough of compartment 19. Footpiece 60 is of such size that it extends almost into contact with the adjacent sloping walls of the trough. The footpiece 60 has an inlet port in the form of a slot in the bottom thereof.

Intermediate its ends, the conduit 59 is provided with a coupling by means of which an air hose 61 connects the conduit 59 to a conventional source of compressed air (not shown) which is positioned outside the tank 10 for supplying the air for operating the pump 58 to create a suction. The conduit 59 includes an outlet branch which discharges into trough 34.

Conduit 59 is provided with a collar 62 from which arms 63 and 64 extend substantially horizontally. Pivotally connected to the extremities of arms 63 and 64 are scraper members 65 and 66. Scraper members 65 and 66. respectively, are held in position parallel to and spaced from the walls of a trough by sloped brackets adapted to adjust the angularity of scraper members 65 and 66, which slotted brackets are secured to footpiece 60.

When this traveling exhaust unit or airlift pump is adapted to travel at a rate of 2 feet per minute in a settling tank having a trough 12 feet in length, sludge settling on a square foot of horizontal bottom of trough 30 will be removed once in each six minute to 12 minute period.

Sludge removed from the bottom of the settling compartment by the traveling airlifts is discharged into channels 34 and 35. Channel 34 is provided with outlets 70a and 70b. Channel 35 is provided with outlets 71a and 71b. The outlets 70a, 70b, 71a and 71b are provided with suitable adjustable closure means 72a, 72b, 73a and 73b, respectively, such as a vertically movable stop gate. When outlets 70b and 71a are closed, the gates 38 and 39 of the adjustable control means for regulation of sewage flow are moved to positions allowing free flow of sewage in channels 34 and 35.

When sludge from, for example, trough 30 is to be split into two portions in channel 34, the gate 38 is set in the position shown and both outlets 70a and 70b are opened. During the travel of exhaust unit 58 in any one direction, sludge is introduced into both channel segments 34a and channel segment 34b. When gate 38 is in the position shown, the major portion of the sludge moving in channel 34 is discharged into re-aeration tank segment 11 and the residue is discharged into tank segment 13.

Aeration in tank segment 11 is effected by introduction of air through dispersers 21 which are supported by their communication with a header 74. Aerated sludge is discharged from tank segment 11 over a weir 75 extending the full length of the side of aeration compartment 18.

Channel segment 34b delivers sludge to sludge digestion compartment 13. Aeration in digestion compartment 13 is effected by introduction of air through dispersers 76 which are supported by their communication with a header 77. When the digestion compartment 13 is quiescent, a supernatant layer is formed and as fresh sludge is introduced into segment 13, supernatant liquor overflows a weir 78 extending the full length of one side of aeration compartment 18.

Clarified liquor obtained through settling of sludge in compartment 19, is discharged over a weir 33 mounted on the wall 17. Clarified liquor overflows the weir into disinfecting segment 20. Chlorine or hypochlorite solution is introduced into segment 20 through pipes 79. The disinfected liquor overflows the weir 80 into a conduit 81 which discharges the liquor to a receiving body of water.

I claim:

1. The method of treating sewage which comprises establishing contiguous aeration and settling zones extending end to end with a common longitudinal flow axis and a sludge digestion zone and a sludge re-aeration zone extending along opposite sides of said longitudinally extending contiguous aeration and settling zones, forming a mixed liquor in said aeration zone consisting of raw sewage and sludge recycled from said settling zone through said sludge re-aeration zone, introducing oxygen-containing gas into said mixed liquor in said aeration zone, discharging aerated mixed liquor from said aeration zone to said settling zone where the sludge settles by gravity and concentrates in a plurality of parallel areas of limited width positioned transverse to said longitudinal axis whereby the concentrates accumulated in each area are made up of sludge solids of relatively uniform settling rates, removing a concentrate of sludge solids from the bottom of each of said plurality of parallel areas of limited width progressively and sequentially, discharging the sludge removed from each of the plurality of parallel areas of said settling tank to individual members of a plurality of flow conducting means positioned above the liquid level of said settling zone and extending transverse to said longitudinal flow axis, continuously transferring a predetermined portion of the sludge being received in at least one individual member of said plurality of flow conducting means to said re-aeration zone, continuously introducing oxygen in dispersed gas form into said sludge transferred to said re-aeration zone whereby biological activity of the sludge is intensified and discharging the re-aerated sludge into said areation zone with distribution in a substantially uniform pattern with regard to the longitudinally extending axis, transferring the sludge received in individual members of said plurality of flow courses, other than said sludge transferred to said re-aeration zone, to said digestion zone, introducing oxygen-containing gas into said digestion zone over extended periods whereby digestion effects elimination of biological activity, arresting gas introduction into said digestion zone to permit formation of a supernatant layer, overflowng said supernatant layer into said continguous aeration zone during the periods of gas arrest by introduction of fresh sludge into said digestion zone, and discharging clarified effluent from said settling zone.

2. A method according to claim 1 wherein a digested sludge and a supernatant liquor are accumulated in said digestion zone and said supernatant liquor is introduced directly into said areation zone and distribted in a substantially uniform pattern with regard to said longitudinal axis.

3. A method according to claim 2 wherein there is established contiguous aeration. settling and disinfecting zones, clarified effluent discharged from said settling zone is mixed with disinfecting medium, and the disinfected mixture is discharged to a receiving body of water.

4. Apparatus for the treatment of sewage comprising a tank compartmentalized by parallel partitions into a central compartment in which liquid flow is lengthwise thereof positioned between a digestion compartment and a re-aeration compartment, each of which extends the length of said central compartment, a wall member positioned transverse to the parallel partitions dividing the central compartment into aeration and settling compartments, angularly disposed lower walls bounding said settling comparment to form sludge accumulation troughs in the bottom thereof which are positioned transverse to the longitudinal flow axis of said central compartment, inlet means at one end of said central compartment for introduction of sewage into said aeration compartment, means for introducing oxygen-containing gaseous medium into the contents of said aeration compartment, means for discharge of clarified effluent from said settling compartment, a plurality of liquid flow conducting means positioned widthwise of said settling compartment and above the normal liquid level in said settling compartment having outlets to both the digestion and re-aeration compartments, closure means for said outlets, control means for selectively settling said closure means of said flow conducting means in positions controlling discharge of the sludge received in said flow conducting means to both said re-aeration compartment and said digestion compartment, control means in said flow conducting means having said outlets to said re-aeration and digestion compartments for regulation of the volume of sludge directed to said re-aeration and said digestion compartments, conduit means movable widthwise in each trough of said settling compartment with an inlet positioned adjacent the bottom of said sludge accumulation trough in the bottom of said settling compartment and an outlet positioned to discharge sludge into said liquid flow conducting means, means for creating suction at said inlet to said movable conduit means to move sludge therethrough and cause the sludge to move through said conduit means and discharge into said liquid flow conducting means, means for introducing oxygen-containing gaseous medium into said digestion and re-aeration compartments extending the length of said central compartment, and means positioned along a side of said aeration compartment parallel to the direction of sewage flow therethrough adapted for direct delivery of sludge re-aerated in said re-aeration compartment. with uniform distribtuion to said aeration compartment.

5. Apparatus for the treatment of sewage comprising a tank compartmentalized by parallel partitions, said partitions dividing said tank into a central compartment in which liquid flow is lengthwise thereof, and a sludge re-aeration compartment and a digestion compartment, each of which extends the length of said central compartment, spaced parallel wall members positioned transverse to the parallel partitions dividing the central compartment into areation, settling and disinfecting compartments, angularly disposed lower walls bounding said settling compartment to form a sludge accumulation trough in the bottom thereof, inlet means at one end of said central compartment for introduction of sewage into said aeration compartment, means for introducing oxygen-containing gaseous medium into the contents of said areation compartment, means associated with the wall member separating said aeration and settling compartments opposite to the inlet means for sewage for transfer of mixed liquor to said settling compartment, means for transfer of clarified effluent from said settling compartment to the disinfecting compartment, liquid flow conducting means positioned widthwise of said settling compartment and above the normal liquid level in said settling compartment having outlets to both the digestion and re-aeration compartments, closure means for said outlets to the re-aeration compartment and the digestion compartment, control means associated with said liquid flow conducting means communicating with both said digestion and re-aeration compartments for regulation of the volume of sludge directed to said digestion compartment and to said re-aeration compartment, conduit means movable widthwise in said settling compartment with an inlet positioned adjacent the bottom of said sludge accumulation trough in the bottom of said settling compartment and an outlet positioned to discharge sludge into said liquid flow conducting means, means for creating suction at said inlet to move sludge therethrough and cause the sludge to move through said conduit means and discharge into said liquid flow conducting means, means for introducing oxygen-containing gaseous medium into the contents of said re-aeration compartment and said digestion compartment and means positioned along the side of said aeration compartment parallel to the direction of sewage flow therethrough adapted to deliver recycle sludge re-aerated to intensify biological activity in said re-aeration compartment with uniform distribution to said aeration compartment.

6. Apparatus according to claim 5 wherein the tank is of circular cross-sectional configuration and the central compartment is formed by spaced partitions positioned parallel to the diametrical chord of the tank.

7. Apparatus according to claim 5 wherein spaced wall members divide said central compartment into an aeration compartment, a settling compartment and an effluent disinfecting compartment, said wall member separating said aeration and settling compartment being provided with port means for transfer of liquid and said wall member separating the settling compartment and disinfecting compartment is provided with overflow weir means for transfer of clarified effluent.

8. The method of treating sewage which comprises establishing contiguous aeration and settling zones extending end to end with a common longitudinal flow axis and a sludge digestion zone and a sludge re-aeration zone extending along opposite sides of said longiturinally extending contigouus zones, forming a mixed liquor in said aeration zone consisting of raw sewage and sludge recycled from said settling zone through said re-aeration zone, introducing oxygen-containing gas into said mixed liquor in said aeration zone, discharging aerated mixed liquor from said areation zone to a settling zone where the sludge settles by gravity and concentrates in a plurality of parallel areas of limited width positioned transverse to said longitudinal axis whereby the concentrations accumulated in each area are made up of sludge solids of relatively uniform settling rates, removing a concentrate of sludge from the bottom of each of said plurality of areas of limited width progressively and sequentially, discharging each sludge fraction removed from the individual areas of said settling tank to individual members of a plurality of flow conducting means positioned above the liquid level of said settling zone and extending transverse to said longitudinal flow axis, transferring the sludge moving in one individual flow conducting means to said re-aeration zone and the sludge moving in the other individual flow conducting means to said digestion zone, introducing oxygen-containing gas into said re-aeration zone whereby biological activity of the sludge is intensified, directly discharging reaerated sludge from said re-aeration zone into said aeration zone and distributing it in a substantially uniform pattern with regard to said longitudinal axis, introducing oxygen-containing gas into said digestion zone over extended periods whereby digestion effects elimination of biological activity, arresting gas introduction periodically to permit formation of a supernatant layer, overflowing said layer into said contiguous aeration zone during the periods of gas arrest by introduction of additional sludge into the digestion zone, and discharging clarified effluent from said settling zone.

References Cited

UNITED STATES PATENTS

| 2,027,370 | 1/1936 | Currie | 210—256 X |
| 3,047,492 | 7/1962 | Gambrel | 210—7 |
| 3,396,102 | 8/1968 | Forrest | 210—7 |

FOREIGN PATENTS

| 493,985 | 5/1919 | France | 210—15 |

REUBEN FRIEDMAN, Primary Examiner

T. G. WYSE, Assistant Examiner

U.S. Cl. X.R.

210—8, 195, 197, 256